United States Patent
Maruyama et al.

(10) Patent No.: US 7,165,179 B2
(45) Date of Patent: Jan. 16, 2007

(54) DIGITAL SIGNATURE VERIFICATION AND PROGRAM TRANSMISSION

(75) Inventors: Hiroshi Maruyama, Tokyo (JP); Naohiko Uramoto, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 10/017,926

(22) Filed: Oct. 29, 2001

(65) Prior Publication Data

US 2002/0116619 A1 Aug. 22, 2002

(30) Foreign Application Priority Data

Nov. 2, 2000 (JP) ............................ 2000-336586

(51) Int. Cl.
*H04L 9/00* (2006.01)
*H04K 1/00* (2006.01)

(52) U.S. Cl. ..................... 713/176; 713/177; 713/180

(58) Field of Classification Search ............... 713/176, 713/177, 180
See application file for complete search history.

(56) References Cited

U.S. PATENT DOCUMENTS

| | | | | |
|---|---|---|---|---|
| 4,206,315 A | * | 6/1980 | Matyas et al. | 713/180 |
| 4,887,296 A | * | 12/1989 | Horne | 380/239 |
| 5,483,595 A | * | 1/1996 | Owen | 380/271 |
| 5,511,122 A | * | 4/1996 | Atkinson | 713/153 |
| 5,680,458 A | * | 10/1997 | Spelman et al. | 380/277 |
| 6,292,897 B1 | * | 9/2001 | Gennaro et al. | 713/175 |
| 6,363,479 B1 | * | 3/2002 | Godfrey et al. | 713/160 |
| 6,377,692 B1 | * | 4/2002 | Takahashi et al. | 380/277 |
| 6,389,532 B1 | * | 5/2002 | Gupta et al. | 713/163 |
| 6,453,416 B1 | * | 9/2002 | Epstein | 713/170 |
| 6,658,565 B1 | * | 12/2003 | Gupta et al. | 713/153 |
| 6,675,296 B1 | * | 1/2004 | Boeyen et al. | 713/156 |
| 6,760,752 B1 | * | 7/2004 | Liu et al. | 709/206 |
| 2002/0077993 A1 | * | 6/2002 | Immonen et al. | 705/77 |

* cited by examiner

*Primary Examiner*—Nasser Moazzami
*Assistant Examiner*—Eleni Shiferaw
(74) *Attorney, Agent, or Firm*—Lisa Yamonaco; Anne Vachon Dougherty

(57) ABSTRACT

The invention includes a proxy server that constitutes means for providing, verifying and logging a digital signature for a message that is to be exchanged via a network, so that a security function for a digital signature can be implemented without changing an application program. In an example embodiment, a digital signature system comprises: applications for performing data processing; and a signature server connected to the applications via a LAN, wherein the signature server intercepts the message communication from the application to a destination device outside the LAN, provides a digital signature for a message document to be exchanged through communication, and transmits the obtained message document to the destination device.

6 Claims, 5 Drawing Sheets

Fig. 6

```
<rule>

<!-- when the root element is purchaseOrder and the level attribute is 'A' (equal to or greater than one million yen), use the key of a company -->

<description about="//purcheOrder[@level='A']">

<key ID="SigningKeyForCompany">

<!-- upon arrival, send mail for confirmation -->
    <whenArrived>
        <comfirm mail="staff@jp.ibm.com">
    </whenArrived>

</decription>

<!-- when the root element is purchaseOrder and the level attribute is 'B' (equal to or greater than 100,000 yen), use the key of the person in charge -->
<description about="//purcheOrder[@level='B']">
    <key ID="SigningKeyForManager">
</decription>

...

</rule>
```

DIGITAL SIGNATURE VERIFICATION AND PROGRAM TRANSMISSION

FIELD OF THE INVENTION

The present invention relates to providing a digital signature for a message exchanged through business message communication via the Internet, and for verifying the signature, so as to authorize the message and a transaction.

BACKGROUND OF THE INVENTION

As the techniques used for a network, such as the Internet, have been developed, a business form by which trading and operations are performed through messages communicated via a network has become popular. For this form, the provision of security is very important.

An XML digital signature technique has gradually been established as a data exchange format for use for business communications transmitted across a network, and it is anticipated that the authentication of negotiable instruments and secured transactions can also be effected by applying the XML digital signature technique. A digital signature technique is a technique by which signature information (as digital information) is added to and used for authenticating a digital document. Generally, to provide a signature in such a case, public key cryptography is used. In this case, a signatory prepares signed text by using hashing to prepare a hash of a compressed document and a secret key that only the signer knows, and transmits the original document with the hash. A verifier (a recipient) employs the public key of the signatory and the original document to determine whether the signature is authentic.

The digital signature technique also includes a function for preventing a third party or a recipient (a verifier) from counterfeiting or forging a signature, and a function for preventing a signatory from disavowing his or her signature.

Thus, when a variety of messages are signed using a unique ID number, a function can be implemented for proving that:

1. a message was prepared by a sender,
2. a message was not altered,
3. the same message was not erroneously received twice, and/or
4. a message was transmitted by a sender.

However, to sign and verify a message using a conventional cryptography library, an application program that employs the digital signature technique must be changed, and this can be quite expensive.

In some cases, a digital signature condition may be established to increase the probative force of a digital signature. As an example, for one digital signature technique, a time limit may be set according to which a signature can be provided only within a predetermined time period, or for another digital signature technique, a condition may be established according to which a signature can not be provided unless a specific process is performed. In these cases, when a specific digital signature is provided as a replacement for an original digital signature, and later, the original digital signature is provided as a post signature, it is convenient for the performance of the operation procedures.

At the same time as a digital signature is provided and verified, the signed message must be stored in a safe log in order to enable the following monitoring. While the stored message can not be altered because it is accompanied by the signature, the message can be browsed. However, since confidential information may be included in a business message, access control is required for a log.

SUMMARY OF THE INVENTION

It is, therefore, one aspect of the invention to mount a proxy server that constitutes means for providing, verifying and logging a digital signature for a message that is to be exchanged via a network, so that a security function for a digital signature can be implemented without the application program being changed.

It is another aspect of the invention to provide a post signing method by using a proxy server to control a digital signature and its verification.

It is an additional aspect of the invention to enable access control for the log of a message by using a proxy server to log a message.

To achieve the above aspects, according to the invention, a proxy server for relaying communications between applications and for performing an additional process comprises: a key manager for managing multiple keys used to generate a digital signature to be provided for a message document that is exchanged between the applications; a signature key determiner for extracting the message document from a predetermined application, and for determining a key used to provide a digital signature based on the message document; and a signature generator for providing a digital signature for the message document by using the key that is obtained from the key manager based on a determination made by the signature key determiner, and for transmitting the message document with the digital signature to a destination application. With this arrangement, digital signatures having different security levels can be provided in accordance with the contents of a message document.

In addition to the above arrangement, the proxy server of the invention further comprises: a log manager for storing the message document with a digital signature provided by the signature generator, and for managing a log.

Also included is a digital signature system is provided using the above described proxy server. The digital signature system comprises: applications for performing data processing; and a proxy server connected to the applications via a network, wherein the proxy server intercepts a communication, transmitted through the network, from an application to an external destination device, provides a digital signature for a message document exchanged via the communication, and transmits the message document with the digital signature to the external destination device.

In addition, the present invention provides a digital signature verification system having the following configuration is provided. The digital signature verification system comprises: applications for performing data processing; and a proxy server connected to the applications via a network, wherein the proxy server intercepts a communication from an external destination device to an application transmitted through the network, verifies a digital signature provided for a message document exchanged via the communication, and transmits the message document that has been authorized.

Also provided is a digital signature method for providing a digital signature for a message document exchanged by applications and for authorizing the message document comprises the steps of: selecting, in accordance with the type of a message document transmitted by a predetermined application, a key used for providing a digital signature for the message document; providing a digital signature for the message document, when key selection rules set for the key are not established, by using a replacement key that is set in advance for the key; transmitting the message document with the digital signature to a destination designated by the application; and using the key, when the key selection rules for the key have been satisfied after the digital signature has been provided using the replacement key, to again provide a digital signature, and transmitting the message document with the digital signature to the destination.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 6 is a diagram showing an example key selection rule written in the XML form.

DESCRIPTION OF THE SYMBOLS

Figure 1:
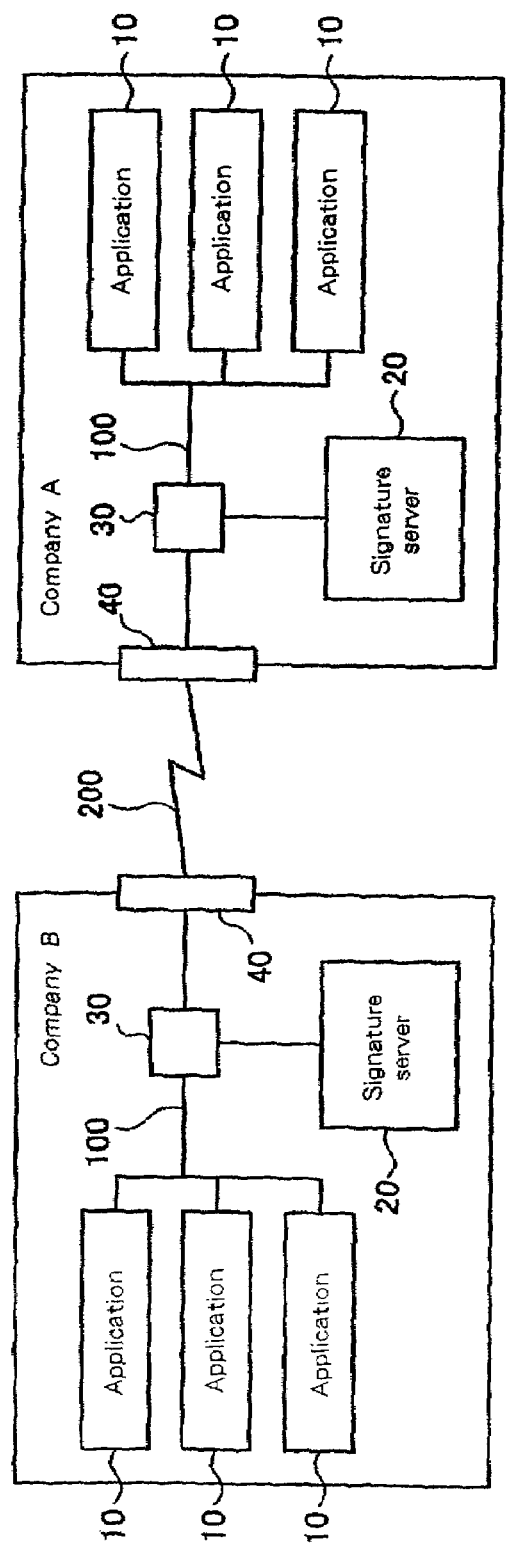
FIG. 1 is a diagram for explaining the general configuration of a digital signature system according to one example embodiment of the present invention.

10: Application
20: Signature server
21: Signature key determiner
22: Key manager
23: Signature key acquisition unit
24: Signature generator
25: Log manager
30: Switch
40: Firewall
100: LAN
200: Network

DESCRIPTION OF THE INVENTION

The present invention provides a proxy server for relaying communications between applications and for performing an additional process comprises: a key manager for managing multiple keys used to generate a digital signature to be provided for a message document that is exchanged between the applications; a signature key determiner for extracting the message document from a predetermined application, and for, based on the message document, determining a key used to provide a digital signature; and a signature generator for providing a digital signature for the message document by using the key that is obtained from the key manager based on a determination made by the signature key determiner, and for transmitting the message document with the digital signature to a destination application. With this arrangement, digital signatures having different security levels can be provided in accordance with the contents of a message document.

The key manager sets multiple key selection rules for obtaining the key, and only when the key selection rules are satisfied can the signature generator obtain the key. That is, since a specific condition is to be satisfied to obtain the key, the reliability of the digital signature using the key can be improved. The acquisition condition can be a time condition for limiting the time period within which the key can be used, or a processing condition for inhibiting the use of the key after a specific process has been performed for the message document.

When the key for generating a digital signature for the message document can not be obtained because the acquisition condition established for the key has not been satisfied the signature generator can employ a replacement key that is defined in advance to provide a digital signature. In this case, after the signature generator has provided a digital signature using the replacement key, when the acquisition condition that is determined for the original key based on the message document is satisfied to enable the acquisition of the original key, the signature generator can again provide a digital signature using the original key. The post signing may be additionally performed for the signed message document, or may be newly performed for the message document before it is signed using the replacement key.

In addition to the above arrangement, the proxy server of the invention further comprises: a log manager for storing the message document with a digital signature provided by the signature generator, and for managing a log. As is described above, to newly perform the post signing for the message document before it is signed using a replacement key, the log manager stores not only the message document for which the signature generator has provided a digital signature using the replacement key, but also the message document without the digital signature. The signature generator obtains, from the log manager, the message document without the digital signature, and provides a digital signature using the original key.

Further, according to the invention, a digital signature system having the following configuration is provided using the above described proxy server. The digital signature system comprises: applications for performing data processing; and a proxy server connected to the applications via a network, wherein the proxy server intercepts a communication, transmitted through the network, from an application to an external destination device, provides a digital signature for a message document exchanged via the communication, and transmits the message document with the digital signature to the external destination device.

In the digital signature system, the proxy server is connected to the network by a hardware or software switch that enables the interception of information transmitted across the network without the sender and the recipient being aware of it. This switch can be a layer 4 switch. Since a communication transmitted by an application can be intercepted, the digital signature can be provided for the message document without the application being changed, i.e., without the application being aware of the digital signature.

Furthermore, according to the invention, a digital signature verification system having the following configuration is provided. The digital signature verification system comprises: applications for performing data processing; and a proxy server connected to the applications via a network, wherein the proxy server intercepts a communication from an external destination device to an application transmitted through the network, verifies a digital signature provided for a message document exchanged via the communication, and transmits the message document that has been authorized.

In the digital signature verification system, the proxy server can be connected to the network via a switch, such as a layer 4 switch. Since a communication with an external device via the network can be intercepted, the digital signature of a message document can be verified without the application being changed, i.e., without the application being aware of the digital signature.

In addition, according to the invention, a network system comprises: multiple groups connected to a wide area network, all of which have applications for performing data processing and proxy servers connected to the applications via a local area network, wherein the proxy server intercepts a communication transmitted by an application of a local group to an application of a different group, provides a digital signature for a message document exchanged via the communication, and transmits the message document with the digital signature to the application of the different group, and wherein the proxy server intercepts a communication from the application of the different group to the application of the local group, verifies a digital signature provided for a message document exchanged via the communication, and transmits the authorized message document to the application of the local group.

When the application of the local group transmits a message document, the proxy server stores the message document with a digital signature in a log, and manages the log. When the application of the local group receives a message document from a different group, the proxy server stores in a log a message document authenticated by a verification of a digital signature, and manages the log. At a predetermined timing, the proxy server compares the transmission log with the reception log for the same message document, and authorizes communication.

The information to be compared need not be all the information in the logs; signature information for a digital signature concerning the same message document, or a hash value used for providing a digital signature for the same message document can be compared. In this case, when the information in the logs is the same, the communication can be authorized. When the information differs, a detailed verification is conducted and all the information in the logs is compared.

According to the invention, an example of a digital signature method for providing a digital signature for a message document exchanged by applications and for authorizing the message document comprises the steps of: selecting, in accordance with the type of a message document transmitted by a predetermined application, a key used for providing a digital signature for the message document; providing a digital signature for the message document, when key selection rules set for the key are not established, by using a replacement key that is set in advance for the key; transmitting the message document with the digital signature to a destination designated by the application; and using the key, when the key selection rules for the key have been satisfied after the digital signature has been provided using the replacement key, to again provide a digital signature, and transmitting the message document with the digital signature to the destination.

According to the invention, a digital signature verification method for verifying a digital signature provided for a message document exchanged by applications, and for authorizing the message document comprises the steps of: accepting a message document with a digital signature that uses a replacement key, when the digital signature on the received message document has been provided by using the replacement key for an original key that is determined in accordance with the type of the message document; receiving a message document, after the message document signed using the replacement key has been accepted, with a digital signature that used the original key; and verifying a digital signature, provided using the original key, to authorize the message document with the digital signature that uses the replacement key.

Further, the present invention is applicable as a program that permits a computer to perform the processes corresponding to the steps of the digital signature method and the digital signature verification method, or as a program product that controls a computer that carries out the functions of a proxy server, and a storage medium on which this program is stored and a transmission apparatus for transmitting the program can be provided.

AN ADVANTAGEOUS EMBODIMENT

An example of an advantageous embodiment of the present invention will now be described in detail while referring to the accompanying drawings. FIG. 1 is a diagram for explaining the general configuration of a digital signature system according to the embodiment. In FIG. 1, company A and company B each include: applications 10 for performing message communication; and a signature server 20 for managing a digital signature provided for messages exchanged by the applications 10. The applications 10 are computers that are controlled by predetermined programs and that implement various functions, including the communication. In FIG. 1, the applications 10 and the signature servers 20 are separately provided based on their functions, and the arrangement shown does not always apply to the hardware configuration. That is, the applications 10 and the signature server 20 may be formed as separate hardware units, or several applications 10 may be operated using the same hardware.

As is shown in FIG. 1, the companies A and B are connected via a wide area network 200, such as an Internet, and the application 10 in each company is connected to a LAN 100, such as an in-house network, and to the network 200 via a firewall 40. The signature server 20 in each company is connected to the LAN 100 via a switch 30. The switch 30 is implemented by hardware, such as a layer 4 switch, or software, for intercepting information exchanged across the network without a sender and a recipient being aware of it.

In this example embodiment, while assuming the business communication, the digital signature system is employed for the exchange of messages by the companies A and B. However, the digital signature system in this embodiment can be applied not only for business communications, but also for communications between specific groups and for the exchange of e-mails by the groups or individuals.

The configuration in FIG. 1, is merely an example, and another configuration may be employed so long as the applications 10 and the signature server 20 are provided as a single group, many of which are connected via the network. Therefore, the switches 30 and the firewalls 40 are not always requisite components. It should be noted, however, that the firewall 40 is provided in this embodiment while taking inter-company communications into account. Further, the signature server 20 is connected via the switch 30 in order to intercept communications between the applications 10 without changing the applications 10, and to add and manage digital signatures.

In addition, in this embodiment, it should be noted that XML documents are exchanged through inter-company communications between the companies A and B (or between the applications 10 of the companies A and B). However, this embodiment can also be applied for documents other than XML documents, or for e-mail.

In FIG. 1, the application 10 prepares an XML message document, such as a product order sheet, a product order receipt sheet or a specification, that is required for business, and transmits the XML document to the corresponding application 10 of the other company. The signature server 20 has a function for intercepting an HTTP connection for message document transmission by the local application 10 to the other company, and a function (reverse proxy) for intercepting an HTTP connection from the other company to a predetermined application 10 at the local company. The signature server 20 provides a necessary digital signature for the message document that is intercepted during the transmission by the local company to the other company, or verifies the digital signature provided for the message document that is intercepted during the transmission from the other company to the local company. The detailed configuration and operation of for the signature server 20 will be described later.

The switch 30 is provided between the applications 10 and the firewall 40 located at the border (entrance/exit) between the LAN 100 and the network 200, and connects the signature server 20 and the LAN 100, so that the signature server 20 can intercept the HTTP connections. It should be noted that communication can also be effected via the signature server 20 by changing the URLs of the applications 10, instead of using the switch 30. However, when the switch 30 is used, the applications 10 need not be changed, and the signature server 20 can add and manage a digital signature.

High security is required for the platform (OS) of the signature server for the following reasons:

1. A secret key used for a signature should not be stolen.
2. The key for a root verification center for verifying the signature should not be rewritten.
3. The access control afforded for a log should not be bypassed.

Thus, common internet access to the signature server 20 should be inhibited, or very limited. Therefore, a method can be employed for using a network address (e.g., a local address, such as 192.168.xx.xx) so that the proxy can not be externally accessed. There is also another method whereby an intercepted packet is converted into a medium, such as an RS-232C or USB, that generally does not pass through the TCP/IP, and for later transmitting the packet to the signature server 20. Using these methods provides better security for the key and the log.

Figure 2:
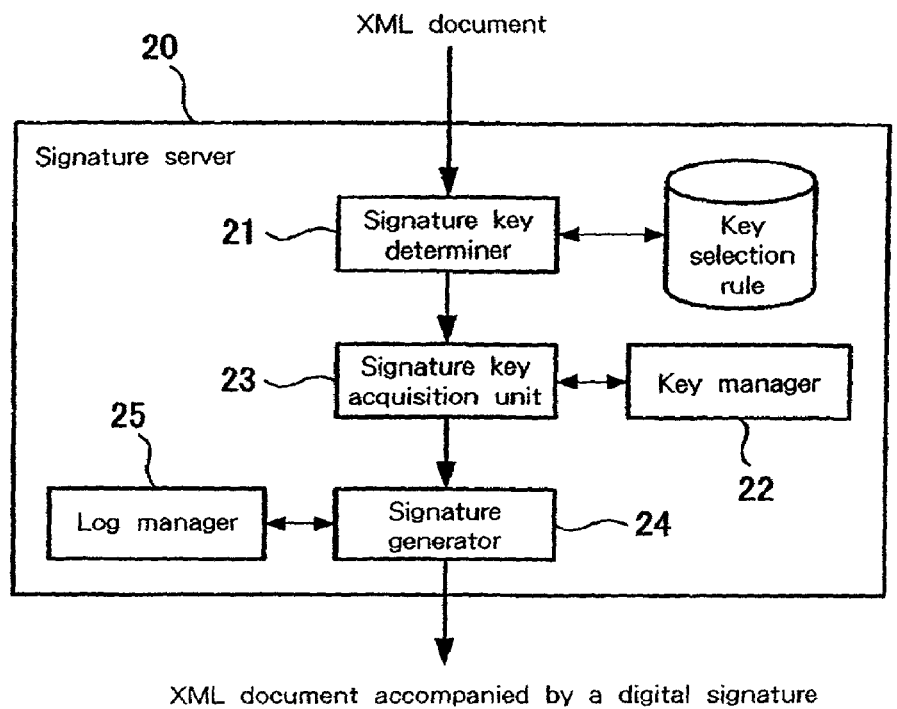
FIG. 2 is a diagram showing an example configuration of a signature server for adding a digital signature according to the embodiment, of FIG. 1.

FIG. 2 is a diagram showing an example configuration of the signature server 20 for adding a digital signature. The digital signature used in this embodiment is an XML digital signature provided by public key cryptography using a hash function.

In FIG. 2, the signature server 20 includes: a signature key determiner 21, for selecting a secret key used for providing a digital signature; a key manager 22, for managing the secret key; a signature key acquisition unit 23, for obtaining a necessary secret key from the key manager 22 in accordance with the selection of the signature key determiner 21; a signature generator 24, for generating signature information using the secret key obtained by the signature key acquisition unit 23, and for providing a signature for a message document; and a log manager 25, for managing the log for the message document.

The signature key determiner 21 obtains an XML message document from the application 10 of the local company, and selects, according to a predetermined key selection rule, a secret key that is required to provide an appropriate signature for the XML document. The key selection rule is a rule for selecting the secret key based on the contents of the XML document, and is written using the XML format, for example.

For the digital signature added to the XML document, various definitions can be set. For example: the date stamp automatically added to all the documents to be transmitted to the other companies; a signature provided by the person in charge after the signature has been examined; the official stamp of the company; or a signature having an intermediate characteristic of these. The signature definition is determined from the definition of the signature key (normally written as a verification practice statement in a digital certificate corresponding to the signature key).

As is described above, different secret keys can be employed in accordance with the contents of the XML document. This can be implemented when the signature key determiner 21 registers as a rule a set of contents for the XML document and a corresponding secret key. Since the contents of the XML document are represented by using XPath, a complicated pattern can be designated, and further, a specific range in the XML document can be designated as a signing range.

FIG. 6 is a diagram showing an example key selection rule written using the XML format. In this example, it is determined that for electronic commerce the company seal will be employed as a secret key for a digital signature for a transaction whereof the price is equal to or greater than one million yen, and that the seal of the person in charge will be employed as the secret key for a transaction whereof the price is equal to or greater than 100,000 yen.

The key manager 22 manages the secret key used for providing a digital signature for the XML document. The key manager 22 can also set the key acquisition condition (key selection rule) for the secret key prepared for the digital signature, and can manage this condition. Specifically when the acquisition condition, such as the time for the use of the secret key or the process to be performed in advance, is established, the use of the corresponding secret key is permitted, whereas in other cases, the use of the secret key is inhibited. Permission for the use of the secret key can be controlled, for example, by loading or unloading the data for the secret key.

For example, when the time condition for permitting signing only within a specific time period in a day is set for a predetermined digital signature, the secret key required for the generation of the pertinent digital signature is loaded for the time period to permit the use of the key. When the acquisition condition is set, such a condition is established to obtain the secret key, so that the reliability of the digital signature provided using the secret key can be increased.

The signature key acquisition unit 23 obtains, from the key manager 22, the secret key that is selected, in accordance with the contents of the XML document, by the signature key determiner 21, and transmits the secret key to the signature generator 24. As is described above, when the acquisition condition for the secret key has not been established at the time whereat the signature key determiner 21 selects the secret key, a default replacement secret key (hereinafter referred to as a replacement key) can be transmitted to the signature generator 24. In this case, when the acquisition condition for the secret key selected by the signature key determiner 21 is finally established, the original secret key can be obtained and transmitted to the signature generator 24.

When the time restriction is set as the acquisition condition, and when the time where signature key acquisition unit 23 attempts to obtain the secret key is not within time period where the secret key is loaded into the key manager 22, the signature key acquisition unit 23 transmits the replacement key to the signature generator 24. When the time where the secret key is to be loaded into the key manager 22 is reached, the signature key acquisition unit 23 obtains the secret key from the key manager 22, and transmits it to the signature generator 24.

The signature generator 24 provides a digital signature for the XML document using the secret key obtained by the signature key acquisition unit 23. In principle, the target XML document is the one transmitted by the application 10, and intercepted by the switch 30. However, as is described above, when the acquisition condition is set for the secret key, and when a digital signature has been provided using the replacement key for the XML document obtained by intercepting, the original secret key is obtained and the digital signature is again provided for the XML document by using the secret key. In this case, the post digital signature using the secret key may be added for the XML document with the digital signature using the replacement key, or may be newly provided for the XML document in the state before the digital signature is provided using the replacement key. The XML document accompanied by a digital signature provided by the signature generator 24 is returned to the LAN 100 and is transmitted to the destination designated by the application 10, and is also transmitted to the log manager 25 and managed therein.

The log manager 25 obtains and manages the log of the XML document with the digital signature provided by the signature generator 24. Generally, the XML document with the digital signature is safely stored for future monitoring. The log can be obtained by the application 10 or during communication; however, it is optimal for the log, including an effective signature, to be obtained at the time of signing or verification, because then it can be ensured that the signature is authenticated when the log is obtained. If the log is not obtained at the time of signing, a problem arises in that an object, to which the signature is provided, that can not be monitored may occur later.

To obtain the log of the XML document with a signature, the XML document signed by the signature generator 24 need only be stored in a long-term stable storage device (e.g., a hard disk). Since a digital signature accompanies the stored XML document, the illegal alteration of the log can be prevented.

Further, since the log may include highly confidential information, such as a credit card number, appropriate access limits should be set for the log access. Access control can also be applied for only one part of the log (e.g., only for the credit card number).

In addition, as is described above, when the condition is set for obtaining the secret key, an XML document without a digital signature can also be stored and managed, so that the digital signature can be newly added later using the secret key to an XML document that has already been signed using the replacement key.

Figure 3:
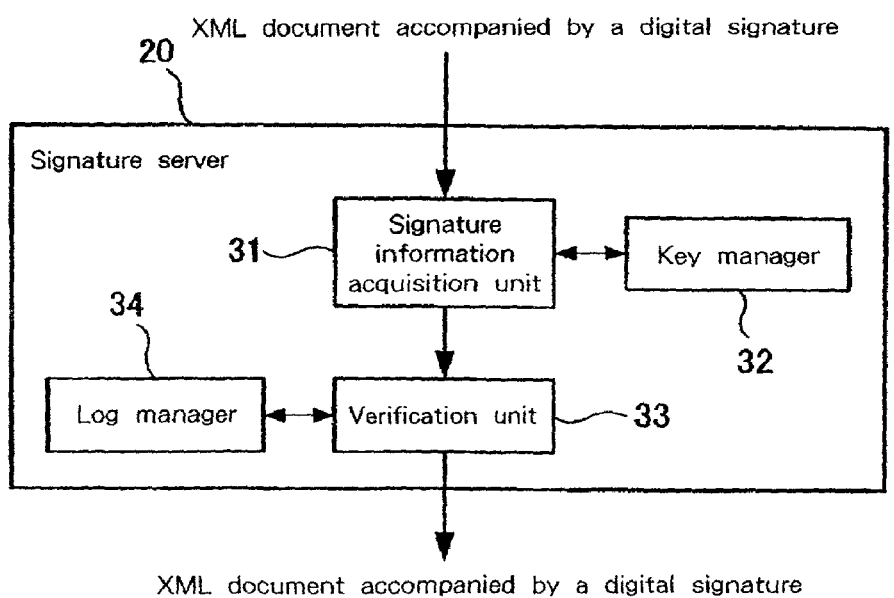
FIG. 3 is a diagram showing an example configuration of a signature server for verifying a digital signature according to the embodiment.

FIG. 3 is a diagram showing the configuration of the signature server 20 for verifying a digital signature. In FIG. 3, the signature server 20 includes: a signature information acquisition unit 31, for obtaining the signature information for a digital signature from a received message document; a key manager 32, for managing a public key used to verify the signature information; a verification unit 33, for verifying the digital signature based on the obtained signature information; and a log manager 34, for managing the log of the received message document.

The signature information acquisition unit 31 externally receives the XML message document. Then, the signature information acquisition unit 31 obtains the signature information for the digital signature added to the XML document, and also, based on the information written in the XML document, acquires from the key manager 32 the public key required for verifying the XML document and transmits it to the verification unit 33.

The key manager 32 manages the public key used to verify the digital signature provided for the XML document. The public key corresponding to the secret key used for signing the XML document may be stored in storage means in the signature server 20 or in a network system, or the public key may be obtained from an external examination organization via a network.

The verification unit 33 verifies the digital signature using the public key that corresponds to the contents of the XML document. When the XML document is authenticated, the verification unit 33 returns the XML document via the LAN 100 to the destination application 10, and also transmits the XML document to the log manager 34. When the authentication of the XML document has not been verified, the verification unit 33 performs a predetermined error process, without returning the XML document to the LAN 100. When a digital signature added to the XML document is one provided not by using the secret key corresponding to the contents of the XML document but by using a predetermined replacement key (this can be confirmed by selecting the public key to verify the digital signature), the verification unit 33 determines the final authorization for the digital signature upon the receipt of the XML document that was signed by using the original secret key.

In this case, the XML document that was signed by using the replacement key either may be held by the signature server 20 until the XML document signed by the original secret key is received, or may be transmitted to the application 10 without waiting for the receipt of the XML document signed by using the secret key, so that the process may be advanced. In any case, the effective period of the XML document signed using the replacement key is defined, and when the XML document signed using the original secret key does not arrive within the effective period, the XML document signed using the replacement key is determined to be invalid. It should be noted that means for comparing document IDs can be employed to correlate the XML document signed using the replacement key with the XML document signed using the original secret key.

As an example of the effective performance of the digital signature method using the replacement key, a process may be initiated for an XML document signed using a replacement key, and when an XML document signed using an original secret key does not arrive within a predetermined period of time, the process that is currently being performed may be invalidated.

The log manager 34 obtains and manages the XML document using a signature verified by the verification unit 33 and the log of the verification results.

To obtain the log of the signed XML document, the XML document verified by the verification unit 33 need only be stored on a long-term stable storage device (a hard disk). Since the stored XML document is accompanied by a digital signature, the illegal alteration of the log can be prevented.

When the stored log data is compared with the log data stored by the log manager 25 of the signing execution side in the signature server 20 of the transaction partner, the completeness of the log data is ensured and the operational security can be improved.

The comparison of the log data need not be performed for all the signed XML documents in the log of the log manager 25, and the signature information for the digital signature, especially the hash value used for the signature, need only be compared. As an example, assume the comparison of the log data for a message transmitted between the companies A and B in FIG. 1. In this example, the hash values in the log data of the companies A and B are exchanged and compared for each predetermined time, such as monthly. When the hash values used for the message communication between the companies A and B match, it is ascertained that all the messages have been verified by both companies A and B using the digital signature. When the hash values differ, it is ascertained that there is a message that has not been verified by either company A or B. Then, all the log data are exchanged to search for the message document that has not been verified by the company A or B.

The individual components of the signature server 20 in FIGS. 2 and 3 are virtual software blocks implemented by a CPU that is controlled by a computer program. The computer program for controlling the CPU is provided by being stored on storage medium such as a CD-ROM or a floppy disk, or by being transmitted via a network. Furthermore, in the above explanation, the digital signature addition configuration and the digital signature verification configuration are separately shown for the same signature server 20; however, the proxy server in FIG. 2 and the proxy server in FIG. 3 may be separately provided.

Figure 4:
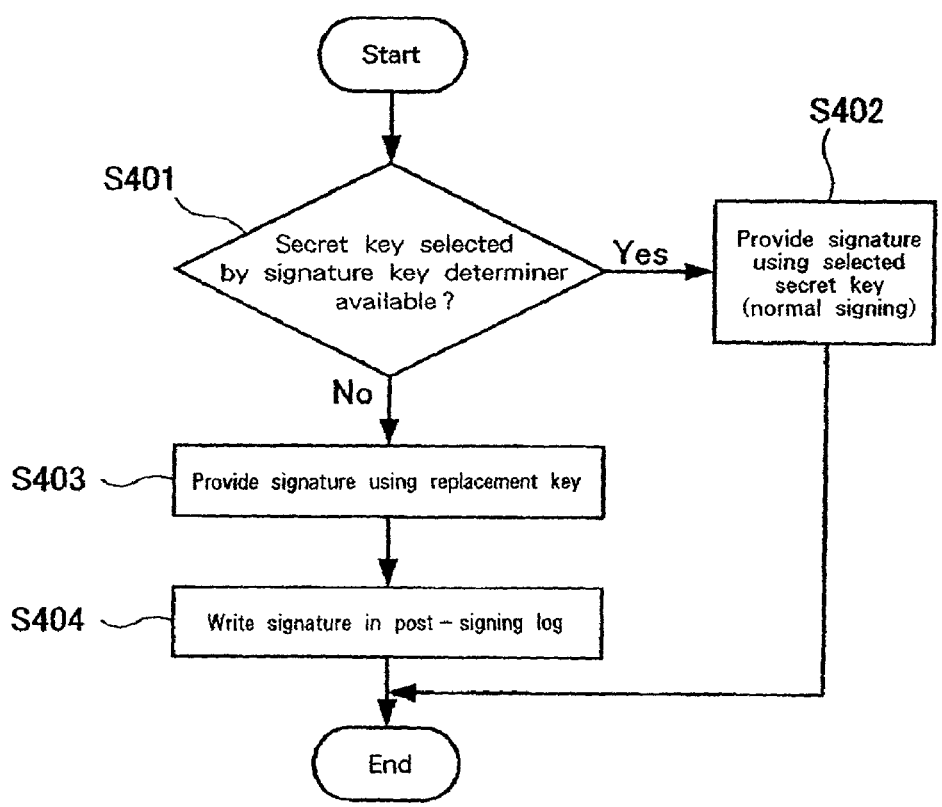
FIG. 4 is an example of a flowchart for explaining the signing processing; including a case wherein the original secret key is not available.

An explanation will now be given for the post signing processing performed by the key manager 22, the signature key acquisition unit 23, the signature generator 24 and the log manager 25 of the signature server 20 in FIG. 2. FIG. 4 is a flowchart for explaining the signing processing, including a case wherein the original secret key can not be employed.

In FIG. 4, first, the signature key acquisition unit 23 inquires of the key manager 22 whether the secret key selected by the signature key determiner 21 can be used (step 401). If the secret key can be used, it is obtained and transmitted to the signature generator 24. The signature generator 24 uses the secret key to provide a digital signature for an XML document, and transmits the obtained XML document (step 402). The processing is thereafter terminated.

If the secret key can not be used because its acquisition condition has not been established, the signature key acquisition unit 23 obtains a default replacement key from the key manager 22, and transmits the replacement key to the signature generator 24. The signature generator 24 provides a digital signature for an XML document using the replacement key, and transmits the obtained XML document (step 403). The log manager 25 writes the XML document into a post signing log that has been prepared (step 404). When the secret key is used later to additionally provide a digital signature for the XML document that was signed using the replacement key, the XML document signed using the replacement key is stored in the post signing log. When the secret key is used later to newly provide a digital signature for the XML document that has not yet been signed using the replacement key, the XML document without the signature is stored in the post signing log.

Figure 5:
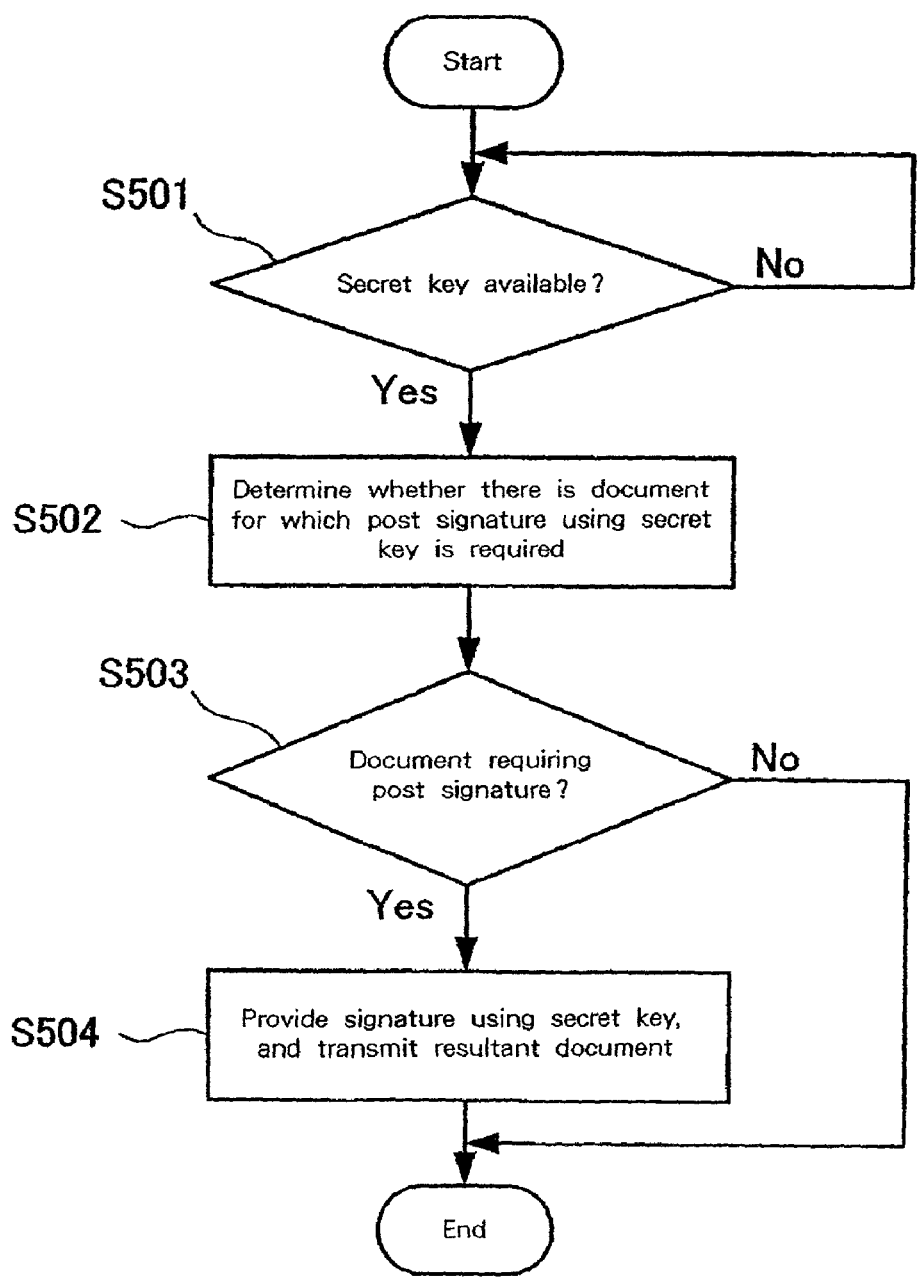
FIG. 5 is a flowchart for explaining the signing processing performed when the original secret key is available because the acquisition condition has been satisfied.

FIG. 5 is an example of a flowchart for explaining the processing performed when the acquisition condition for a predetermined secret key is established and the secret key is available. In FIG. 5, when the predetermined secret key is available, the log manager 25 determines whether there is an XML document for which the post signing using the secret key is required (steps 501 and 502). If there is such an XML document in the post signing log, the signature generator 24 receives the secret key from the signature key acquisition unit 23 and the XML document from the log manager 25, provides a digital signature for the XML document using the secret key, and transmits the obtained XML document (steps 503 and 504).

As is described above, when a required secret key can not be used, a digital signature is provided for a document using a replacement key, and the document is transmitted (FIG. 4), and when the secret key can be used, a digital signature is provided for the document later and the obtained document is transmitted (FIG. 5).

It is assumed that unique serial numbers are provided for digital signatures. Thus, when a post signature has been provided, or when the same message has been transmitted twice due to an erroneous process, the operation based on the message document (e.g., an order reception process in response to the order using the message document) can prevent overlapping.

Thus, as is described above according to the invention, since the means for providing, verifying or logging a digital signature for a message exchanged over a network is mounted as a proxy server, the security function using the digital signature can be improved without a change of an application program being required.

Further, according to the invention, a post signing method can be provided by controlling the digital signature and its verification using a proxy server. In addition, according to the invention, enable access control can be exercised for the log of a message by logging a message using a proxy server.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements, and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A proxy server for relaying communications between applications and for performing an additional process comprising:
   a key manager for managing multiple keys used to generate a digital signature to be provided for a message document that is exchanged between said applications, wherein each of said multiple keys is used to sign messages having particular message contents;
   a signature key determiner for extracting said message document from a predetermined application, and for, based on the contents of said message document, determining a selected key from said multiple keys that is to be used to provide a digital signature, wherein said contents do not include any digital signature data; and
   a signature generator for providing a digital signature for said message document by using said key selected that is obtained from said key manager based on a determination made by said signature key determiner, and for transmitting said message document with said digital signature to a destination application,
   wherein said key manager sets multiple key selection rules and only when said key selection rules are satisfied can said signature generator obtain said selected key, and wherein, when said selected key for generating a digital signature for said message document can not be obtained, said signature generator employs a predetermined replacement key to provide a digital signature, and
   wherein, after said signature generator has provided a digital signature using said replacement key, when said selection rules are satisfied to enable the acquisition of said selected key, said signature generator again provides a digital signature using said selected key.

2. The proxy server according to claim 1, further comprising a log manager for storing said message document with a digital signature provided by said signature generator, and for managing a log, and wherein said log manager stores not only said message document for which said signature generator has provided a digital signature using said replacement key, but also said message document without digital signature; and wherein said signature generator obtains, from said log manager, said message document without said digital signature, and provides a digital signature using said selected key.

3. A digital signature system comprising:
   applications for performing data processing; and
   a proxy server connected to said applications via a network, wherein said proxy server manages multiple keys,
   wherein each of said multiple keys is used to sign messages having particular message contents, and wherein said proxy server intercepts a communication, transmitted through said network, from one of said applications to an external destination device, selects one selected key of said multiple keys based on said message contents, provides a digital signature for a message document exchanged via said communication using said selected key, wherein said contents do not include any digital signature data, and transmits said message document with said digital signature to said external destination device, and
   wherein said proxy server permits a key used to provide a digital signature to be changed in accordance with the contents of a message document; and wherein said proxy server sets key selection rules and permits digital signature using said selected key when said key selection rules have been satisfied, and
   wherein, when said key selection rules have not been satisfied, said proxy server employs a predetermined replacement key to provide a digital signature; and wherein, when said key selection rules are satisfied after said digital signature has been provided using said replacement key, said proxy server again employs said selected key to provide a digital signature for said message document.

4. A storage medium embodying a computer-readable program that causes a computer to perform:
   a process for selecting one selected key of a plurality of keys used to provide a digital signature for a message document in accordance with the contents of message document transmitted from a predetermined application, wherein said contents do not include any digital signature data and wherein each of said plurality of keys is used to sign messages having particular message contents;
   a process for providing a digital signature for said message document using said selected key, and for employing a predetermined replacement key to provide said digital signature for said message document, when key selection rules have not been satisfied; and
   a process for employing said selected key to provide again a digital signature for said message document, when said key selection rules are satisfied after said digital signature has been provided using said replacement key.

5. A program transmission apparatus comprising:
   storage means for storing a program that permits a computer to perform:
   a process for selecting one selected key of multiple keys used to provide a digital signature for a message document in accordance with the contents of the message document transmitted from a predetermined application, wherein said contents do not include any digital signature data and wherein each of said multiple keys is used to sign messages having particular message contents;

a process for providing a digital signature for said message document using said selected key and for employing a predetermined replacement key to provide said digital signature for said message document when key selection rules have not been satisfied; and a process for, when said key selection rules are satisfied after said digital signature has been provided using said replacement key, employing said selected key to provide again a digital signature for said message document; and transmission means for reading said program from said storage means, and for transmitting said program.

6. A computer-implemented digital signature method for providing a digital signature for a message document exchanged by applications and for authorizing said message document, comprising the steps of:

selecting, in accordance with the contents of a message document generated by one of said applications, one selected key of a plurality of keys used for providing a digital signature for said message document, wherein said contents do not include any digital signature data and wherein each of said plurality of keys is used to sign messages having particular message contents;

providing a digital signature for said message document; and transmitting said message document with said digital signature to a destination designated by said one of said applications, wherein key selection rules are provided and further comprising the steps of:

providing a digital signature for said message document, when key selection rules are not established, by using a predetermined replacement key;

using said selected key, when said key selection rules have been satisfied after said digital signature has been provided using said replacement key, to again provide a digital signature; and transmitting said message document with said digital signature to said destination.

* * * * *